United States Patent Office 3,043,093
Patented July 10, 1962

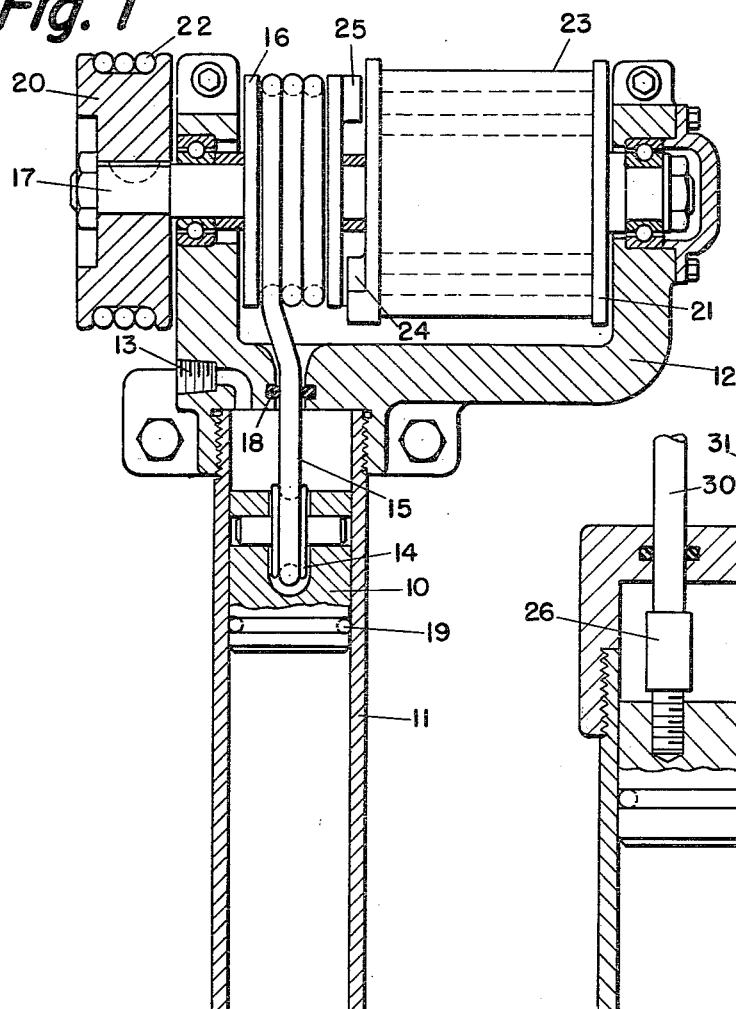
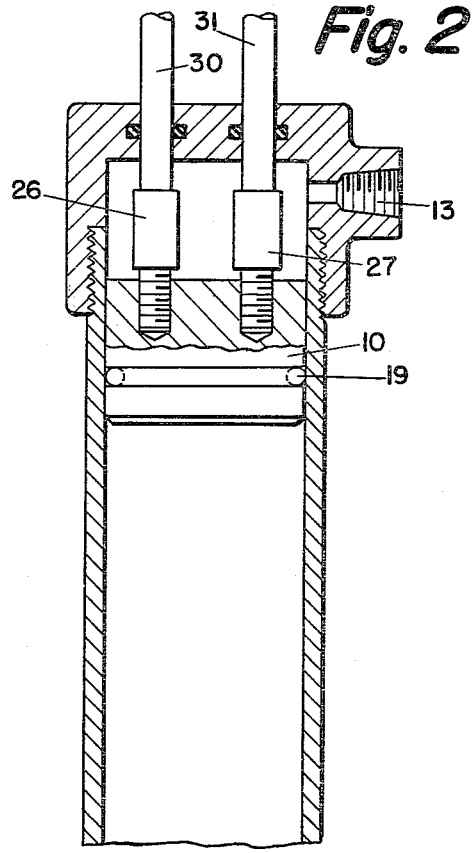
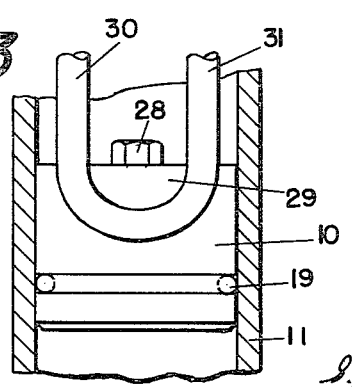

3,043,093
CABLE COUPLED ACTUATOR
Albert M. Stott, Aldan, Pa., assignor to the United States of America as represented by the Secretary of the Army
Filed Mar. 8, 1960, Ser. No. 13,671
1 Claim. (Cl. 60—26.1)
(Granted under Title 35, U.S. Code (1952), sec. 266)

The invention described herein may be manufactured and used by or for the Government for governmental purposes without the payment to me of any royalty thereon.

This invention relates to actuators which are operable in response to a gas pressure, and has for its purpose the provision of an improved actuator which occupies relatively little space, is capable of operating a plurality of load devices in timed relation, and is constructed to provide an improved seal between the stationary and movable elements exposed to the hot operating gas.

Various types of actuators heretofore available have been designed to operate in response to a gas pressure generated by the firing of an explosive cartridge. Such actuators have generally left something to be desired with respect to the rigidity of the piston rod which required unobstructed space prior to stroke. Another limitation of these currently available actuators is that they are incapable of operating a plurality of load devices with a time delay between the operation of the different devices. The present invention avoids these difficulties by the provision of an improved actuator wherein the piston rod heretofore forming the coupling between the load and its driving piston is replaced by a flexible cable. This cable may consist of a ribbon or metal or a stranded steel core encased in a plastic shield consisting of nylon, neoprene, Teflon or the like. Obviously, the cable may be replaced by a metal ribbon, a plurality of cables or other suitable flexible member. It has the important advantage that (1) it permits a more effective seal between it and the part through which it moves due to the fact that the shield is a heat insulator, and (2) it may function to operate different load devices at different times and at different speeds.

The invention will be better understood from the following description when considered in connection with the accompanying drawings and its scope is indicated by the appended claim.

Referring to the drawings:

FIG. 1 is a view, partly in section, of an actuator constructed in accordance with the present invention, and, FIGS. 2 and 3 illustrate different types of coupling between the gas operated piston and the cable which connects the piston to the load device.

As indicated by FIG. 1, the actuator includes a piston 10 which is movable within a cylinder 11. This cylinder is closed at one end by a bracket 12 and has a gas inlet port 13 through which a gas under pressure may be delivered from any suitable source. Pivoted in the piston 10 is a pulley 14 which is arranged to cooperate with a cable 15. The cable 15 has one of its ends fixed to the bracket 12 from which it passes over the pulley 14 to a pulley 16 fixed to a shaft 17. At the point of its passage through the bracket 12, the cable is surrounded by a seal ring 18. A seal ring 19 surrounds the piston 10.

On the same shaft 17 as the pulley 16 are a pulley 20 and a pulley 21. The pulley 20 functions through a cable 22 to operate a load device such as a belt and harness release mechanism. The pulley 21 functions through a web 23 to operate another load device such as means for positioning the shoulders of a pilot prior to his ejection from a plane. A spring (not shown) operates to bias the pulley 21 to its illustrated position where its drive lug 24 is angularly spaced from a cooperating drive lug 25 of the pulley 16. The shaft 17 rotates in antifriction bearings which are mounted in the bracket 12.

In the operation of the actuator, a gas under pressure is applied through the port 13 to the piston 10 which moves away from the closed end of the cylinder and operates through the cable 15 first to rotate the pulley 20 and then to rotate the pulley 21 when the drive lug 25 engages the drive lug 24. The fact that the cable 15 is attached to the bracket 12 and rides over the pulley 14 is advantageous in that it provides a mechanical advantage which shortens the length of the cylinder.

As indicated by FIGS. 2 and 3, the operating cables may have their ends fixed to the piston 10. In FIG. 2, this is effected by cable terminals 26 and 27 which are threaded into the piston. In FIG. 3, the cables are anchored to the piston by a bolt 28 and support member 29. In each case, the cables 30 and 31 pass out of the cylinder through a seal ring which is partially embedded in the end cap of the cylinder.

I claim:

In an actuator, the combination of a cylinder having a closed end with an opening therein, a piston movable in said cylinder and completing a firing chamber therein, a pulley journaled in said piston, means for introducing into said chamber a gas generated by the firing of an explosive charge, a load device, and a plastic coated cable fixed at one of its ends to said closed end and extending around said pulley and through said opening to said load device, said cable sealing said opening against the escape of said gas.

References Cited in the file of this patent
UNITED STATES PATENTS

| | | |
|---|---|---|
| 1,361,909 | Schoenknecht | Dec. 14, 1920 |
| 1,444,984 | Simmon | Feb. 13, 1923 |
| 2,094,124 | Huffman | Sept. 28, 1937 |
| 2,289,766 | Fieux | July 14, 1942 |
| 2,647,774 | Newberry, Jr. | Aug. 4, 1953 |
| 2,728,538 | Mazis | Dec. 27, 1955 |
| 2,765,130 | Replogle et al. | Oct. 2, 1956 |
| 2,904,286 | Bleck | Sept. 15, 1959 |